United States Patent [19]

Takahashi et al.

[11] Patent Number: 5,005,948

[45] Date of Patent: Apr. 9, 1991

[54] LENS MOUNTING APPARATUS FOR A TELEVISION CAMERA

[75] Inventors: Masami Takahashi, Zushi; Ichiro Kajiya, Yokohama, both of Japan

[73] Assignee: Matsushita Electric Industrial Co., Ltd., Kadoma, Japan

[21] Appl. No.: 424,789

[22] Filed: Oct. 20, 1989

[30] Foreign Application Priority Data

Oct. 20, 1988 [JP] Japan .................. 63-264534

[51] Int. Cl.$^5$ .................. G02B 7/02; H04N 5/30
[52] U.S. Cl. .................. 350/252; 350/255; 350/429; 354/195.1; 358/229
[58] Field of Search ............... 350/252, 255, 247, 257, 350/429, 430; 354/286, 195.1, 195.13, 400; 358/125, 906, 224, 225, 227, 229

[56] References Cited

U.S. PATENT DOCUMENTS

| | | | |
|---|---|---|---|
| 4,712,897 | 12/1987 | Crema | 350/255 |
| 4,733,261 | 3/1988 | Gunshi et al. | 354/195.1 |
| 4,769,711 | 9/1988 | Date | 358/229 |
| 4,803,557 | 2/1989 | Bridges | 358/229 |
| 4,834,514 | 5/1989 | Atsuta et al. | 350/429 |

Primary Examiner—Bruce Y. Arnold
Assistant Examiner—Loha Ben
Attorney, Agent, or Firm—Panitch, Schwarze, Jacobs & Nadel

[57] ABSTRACT

A lens mounting apparatus for television cameras, which is provided with a lens mounting mechanism having a cylindrical lens holder capable of mounting thereto a lens, a ring mechanism having at the inner periphery slanted cam faces and rotatably and slidably supported to the lens holder, a bracket member holding an image pickup element and slidably supported to the lens mounting mechanism, an elastic member for biasing the bracket member in the direction of the optical axis of the lens mounting mechanism, and projections fixed to the outer periphery of the lens holder and abutting against the slanted cam faces at the ring mechanism, so that the bracket member biased by the elastic member urges the ring mechanism so as to regulate a movement of the ring mechanism in the direction of the optical axis by abutting the slanted cam faces against the projections, the ring mechanism being rotated to move the bracket member toward or away from the lens mounting mechanism, thereby enabling a flange back distance to be changed with ease.

11 Claims, 5 Drawing Sheets

LENS MOUNTING APPARATUS FOR A TELEVISION CAMERA

BACKGROUND OF THE INVENTION

1. Field Of The Invention

The present invention relates to a lens mounting apparatus for mounting a television camera.

2. Description Of The Prior Art

In a conventional television camera, especially a television camera for closed-circuit televisions (CCTVs), an image pickup element is axially movably mounted with respect to a lens holder for mounting the lens so that the image pickup element can be flange-back-adjusted (adjusted in the direction of the optical axis of the image pickup element) from the front of the camera.

FIG. 6 shows a conventional lens mounting apparatus, in which an image pickup element 53 is held by a sensor mount 54 and a holder 55. A leaf spring 56 is vertically mounted at the front side of a bracket member 52 by means of a screw bolt 60. The image pickup element 53, the sensor mount 54 and the holder 55 assembled as above-mentioned, are mounted to the rear of the bracket member 52 by means of screws 61. The bracket member 52 is fitted inside of the rear of the lens holder 51 which is mounted to the front chassis 59 by screw bolts 62, the front escutcheon 58 is mounted to the front chassis 59, and a front projection of the lens holder 51 projects frontward through a bore 63 at the front escutcheon 58. An adjusting ring 57 screws with a screw thread at the outer periphery of the projection.

The adjusting ring 57 is rotated to push at the rear end thereof the bracket member 52, thereby enabling the bracket member 52 and the image pickup element 53 to be moved longitudinally. After the movable adjustment finishes, a fixing screw 65 screws with a threaded bore formed at the adjusting ring 57 and the tip of the fixing screw 65 is brought into press-contact with the screw thread 64 at the lens holder 51, thereby locking it.

The adjusting ring 57 is rotated to adjust a flange back distance, (distance from the lens holder surface to the image formation face) of the image pickup element 53, thereby enabling variation in the flange back distance of lens to be absorbed.

In recent years, television camera for CCTVs have used a variety of different television lenses in a flange back distance so that in addition to the socalled C mount lens (having a flange back distance of 17.526 mm), it is required that the camera is provided with lenses of a different flange back distance (for example, the flange back distance being 12.5 mm). The above-mentioned conventional construction, however, can adjust variation in the flange back distance, but cannot be provided with the lenses different in the flange back distance, thereby creating the problem in that only a defined lens is usable therein.

SUMMARY OF THE INVENTION

The lens mounting apparatus for television cameras of the present invention, which overcomes the above-discussed and numerous other disadvantages and deficiencies of the prior art, comprises a lens mounting mechanism on which a lens is mounted, a ring mechanism supported to said lens mounting mechanism, an elastic member for biasing said ring mechanism in the direction of the optical axis of said lens mounting mechanism, and a regulating member which abuts against slanted cam faces formed in said ring mechanism so as to regulate a movement of said ring mechanism by said elastic member in the direction of the optical axis of said lens mounting mechanism, wherein an image pickup element-supporting member is moved toward or away from said lens mounting mechanism corresponding to said movement of said ring mechanism in the direction of said optical axis.

In a preferred embodiment, the ring mechanism is provided with a plurality of slanted cam faces that are continuously formed, at least one of said slanted cam faces being different in a slant angle from the others.

In a preferred embodiment, the lens mounting mechanism is provided with a cylindrical member onto which a lens is mounted, said cylindrical member supporting said ring mechanism.

In a preferred embodiment, projections that are provided at the outer periphery of said cylindrical member abut against said slanted cam faces formed at the inner periphery of said ring mechanism, thereby regulating the movement of said ring mechanism in the direction of said optical axis.

In a preferred embodiment, the lens mounting mechanism is provided with a guide mechanism for guiding said image pickup element-supporting member in the direction of said optical axis.

In a preferred embodiment, a biasing force of said elastic member is applied to said ring mechanism through said image pickup element-supporting member.

The lens mounting apparatus for television cameras of the present invention can also comprise a lens mounting mechanism having a cylindrical lens holder onto which a lens is mounted, a bracket member for holding an image pickup element, a guide mechanism for supporting said bracket member at the rear side of said lens mounting mechanism in a slidable manner in the direction of the optical axis of said lens mounting mechanism, an elastic member for biasing said bracket member in the direction of the optical axis of said lens mounting mechanism, a ring mechanism supported rotatably and slidably to said lens holder of said lens mounting mechanism and capable of abutting against said bracket member, slanted cam faces formed at the inner periphery of said ring mechanism, and projections provided at the outer periphery of said lens holder, wherein said ring mechanism that is pressed in the direction of said optical axis by said bracket member biased by said elastic member is regulated by abutment of said slanted cam faces against said projections.

In a preferred embodiment, a plurality of slanted cam faces that are different in a slant angle are formed in a continuous manner at said ring mechanism.

In a preferred embodiment, a third slanted cam face of a steep gradient is formed between first and second cam faces each of a gentle gradient.

In a preferred embodiment, cutouts are formed at the rear end of said cylindrical lens holder and projections formed at the side surface of said bracket member are inserted into said cutouts respectively, thereby slidably supporting said bracket member onto said lens holder by means of said cutouts.

In a preferred embodiment, a chassis is mounted to the rear portion of said lens mounting mechanism, so that said elastic member retained at one end thereof to said chassis biases said bracket member.

Thus, the invention described herein makes possible the objectives of (1) providing a lens mounting apparatus for television cameras, that can switch a lens mount corresponding to lenses different in the flange back distance and moreover can absorb variation in the flange back distance of lenses so as to adjust the focus of the lens, thereby being favorable from the view point of being an inexpensive system and easy to operate; and (2) providing a lens mounting apparatus for television cameras that can fine-adjust a different flange back distance to adjust the focus of lens.

BRIEF DESCRIPTION OF THE DRAWINGS

This invention may be better understood and its numerous objects and advantages will become apparent to those skilled in the art by reference to the accompanying drawings as follows:

FIGS. 1 through 5 show a lens mounting mechanism for a television camera at an embodiment of a lens mounting apparatus for a television camera of the invention, in which FIG. 1 is a perspective view showing the decomposition of a lens mounting apparatus for television cameras of the present invention.

FIG. 2 is a perspective view showing the adjusting ring of the lens mounting apparatus of FIG. 1.

FIG. 3 is a front view showing the lens mounting apparatus of FIG. 1 in the assembly state.

FIG. 4 is a perspective view showing a part of the lens mounting apparatus of FIG. 1 in the assembly state.

DESCRIPTION OF THE PREFERRED EMBODIMENTS

Figure 1:
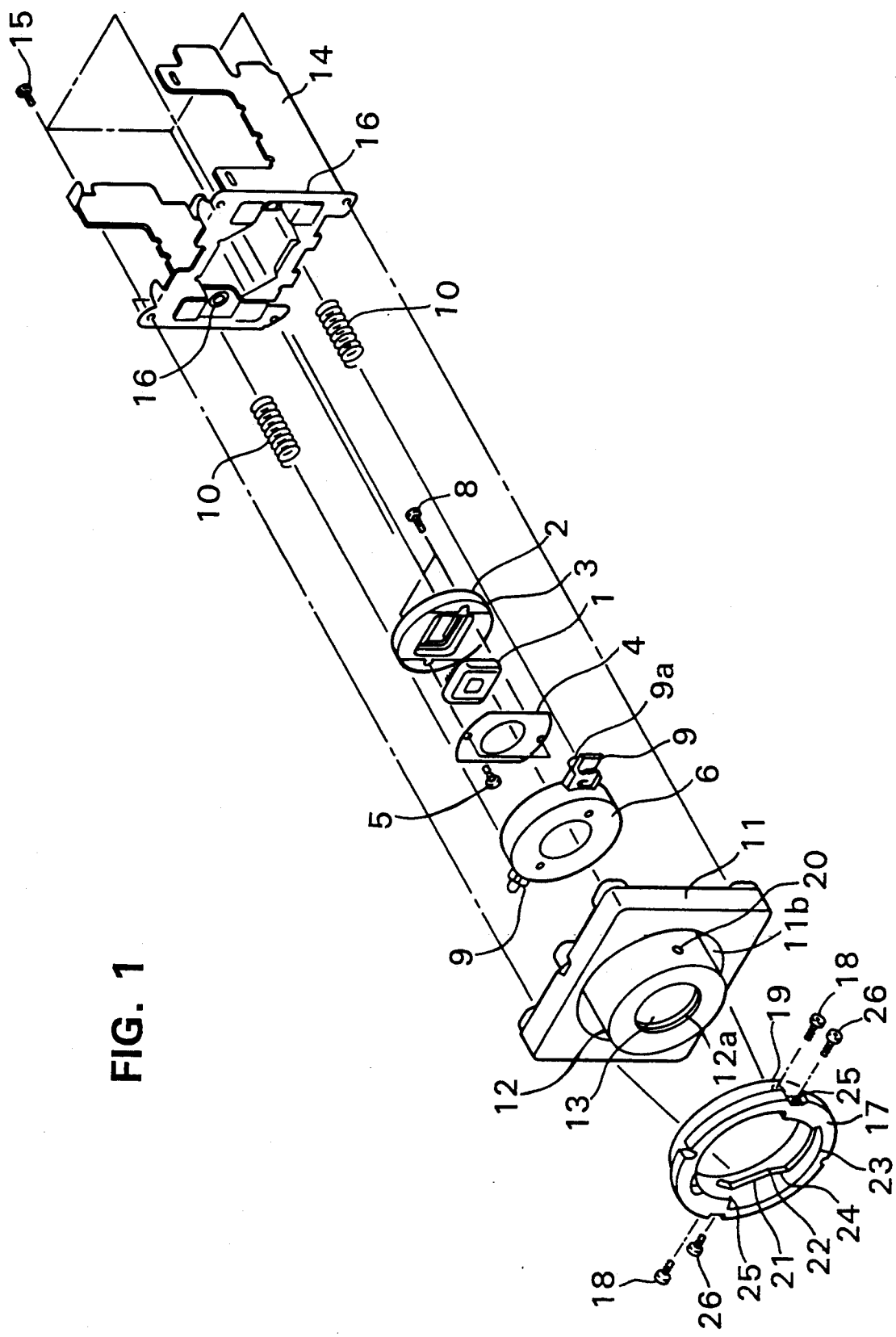
Figure 5A:
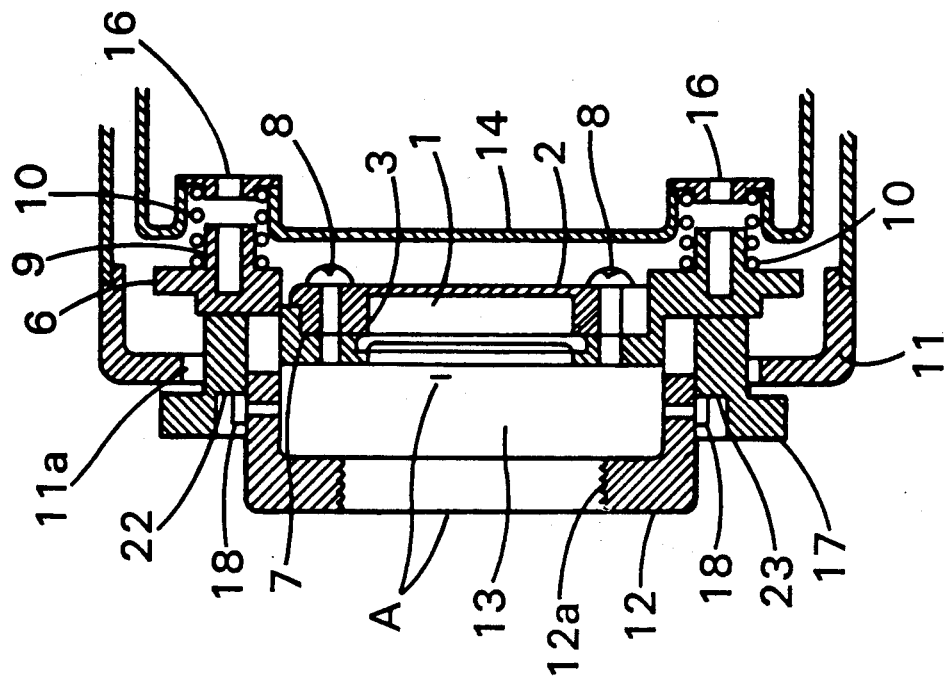
FIG. 5a is a sectional view taken along the line V—V in FIG. 3, when a particular mount is switched.
Figure 5B:
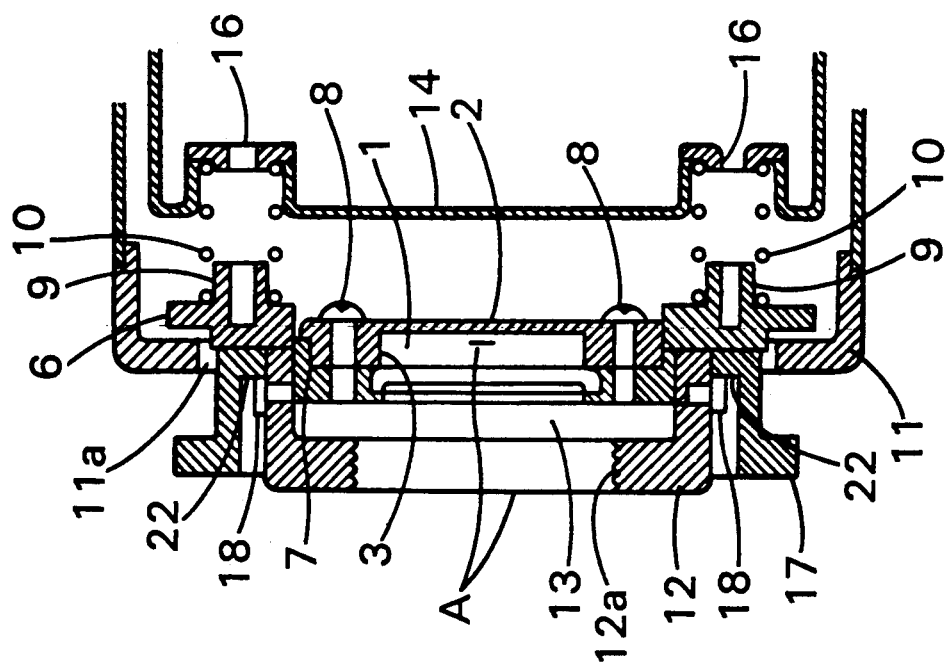
FIG. 5b is the same sectional view, as that in FIG. 5a when a usual C mount is switched.
Figure 6:
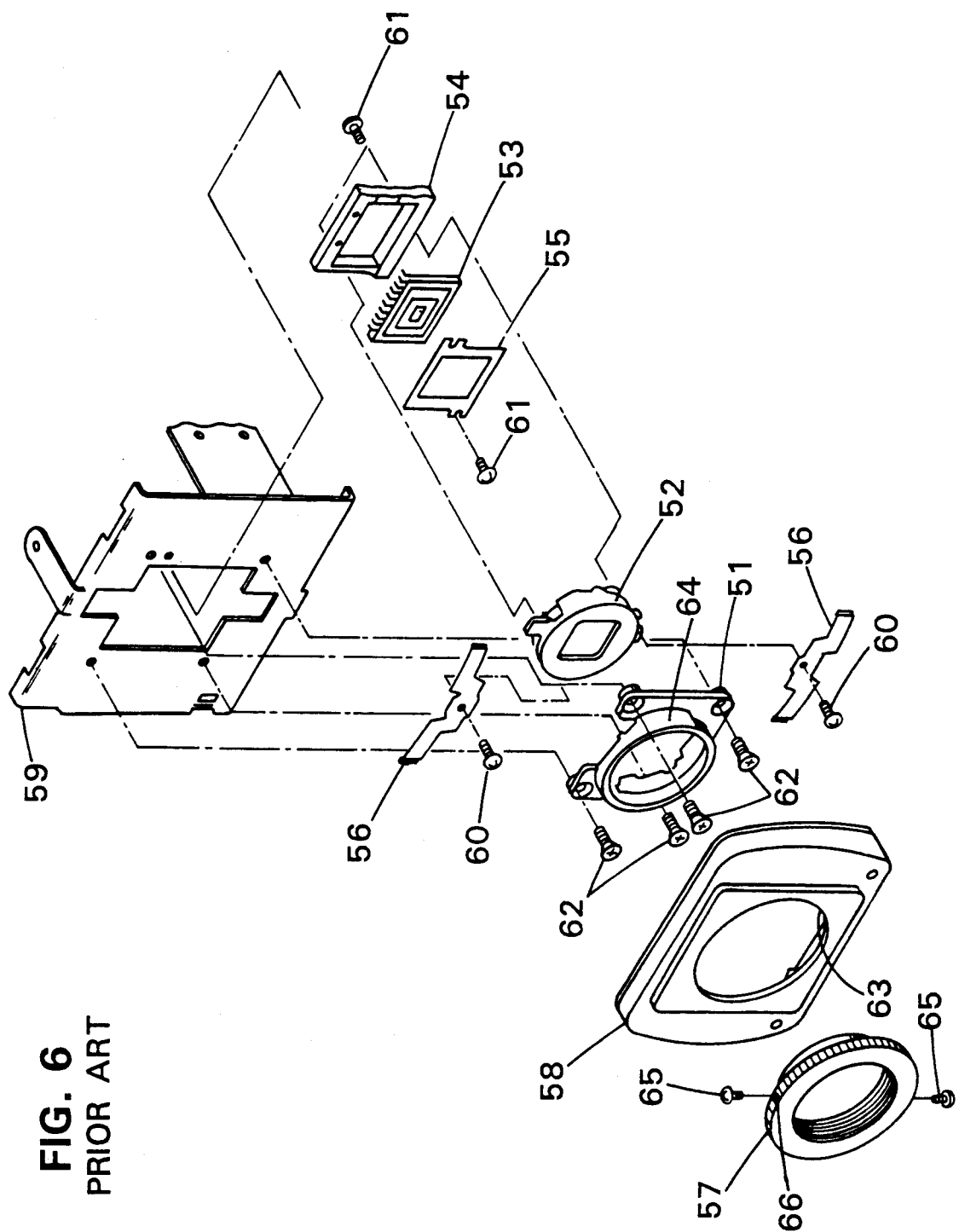
FIG. 6 is a perspective view showing the decomposition of a conventional lens mounting apparatus for television cameras.

FIG. 1 shows a lens mounting apparatus for television cameras of the present invention, which comprises a lens mounting mechanism such as a front escutcheon 11, on which a lens is mounted, a ring mechanism such as an adjusting ring 17, which is supported to the lens mounting mechanism, an elastic member such as coil springs 10 for biasing said ring mechanism in the direction of the optical axis of said lens mounting mechanism, and a regulating member such as projections 18, which abuts against slanted cam faces 21 formed in said ring mechanism so as to regulate a movement of said ring mechansim by said elastic member in the direction of the optical axis of said lens mounting mechanism. An image pickup element 1 is fitted into a recess 3 of an element mount 2 and pressed by an element holder 4, and the element mount 2 and the element holder 4 are fixed by screws 5. When the image pickup element 1 has a mounting bore, it can be directly fixed to the element mount 2. Into a recess 7 (FIGS. 5a and 5b) at the rear of a bracket member 6 is inserted the front portion of the element mount 2 holding therein the image pickup element 1, the element mount 2 being fixed by screws 8 (FIGS. 5a and 5b).

Figure 3:
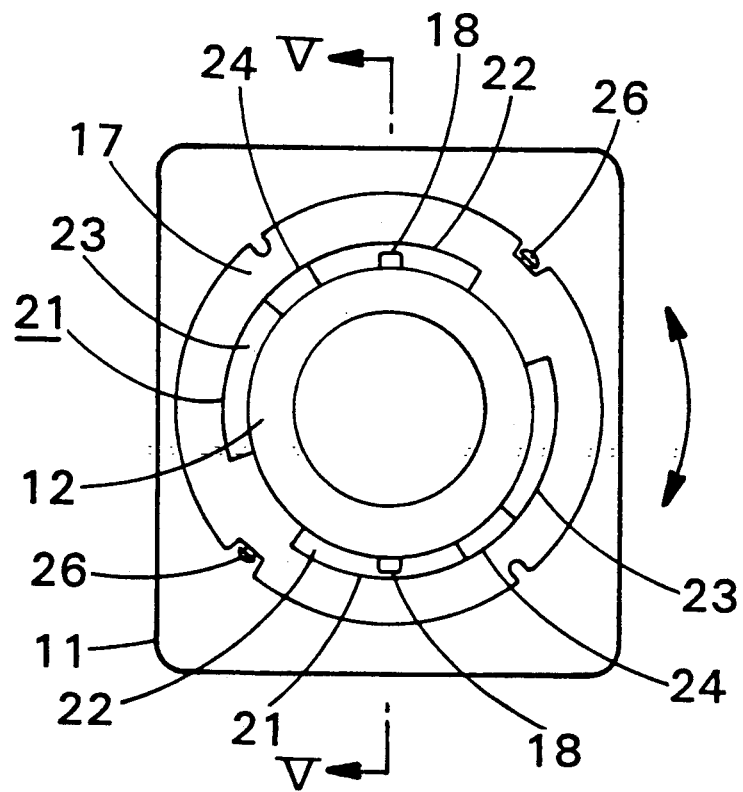
Figure 4:
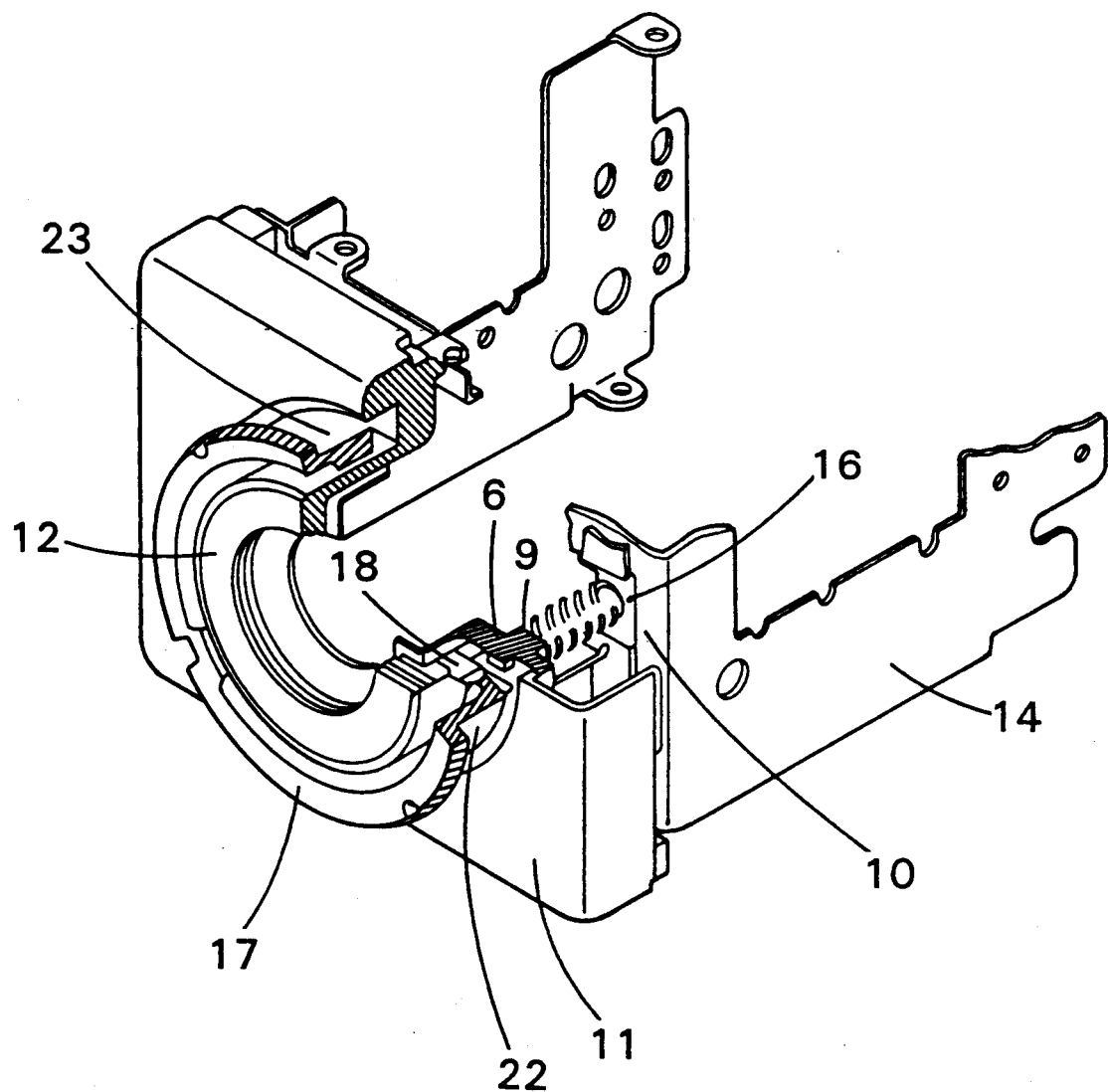

A pair of projections 9 are formed at both the lateral sides of the bracket member 6 and provided with projections 9a for receiving springs respectively, the projections 9a retaining coil springs 10 at one end thereof respectively. Reference numeral 12 designates a cylindrical lens holder that is incorporated with the front escutcheon 11 into one body, the lens holder 12 being connected at the rear portion thereof with the rear surface of the front escutcheon 11. At the connecting portion of the lens holder 12 and the front escutcheon 11 are formed cutouts 11a (FIGS. 5a and 5b) into which the projections 9 at the bracket member 6 are inserted respectively, the bracket member 6 being guided by the cutouts 11a so as to be axially (in the direction of the optical axis) slidable. Reference numeral 11b designates an annular groove formed between the outer periphery of the lens holder 12 and the central bore at the front escutcheon 11, the lens holder 12 being provided at the front thereof with a threaded groove 12a screwable with screws formed at one end of the lens. The bracket member 6 enters at the front portion thereof into a recess 13 at the rear side of the cylindrical lens holder 12. In this way, the cylindrical lens holder 12 and the front escutcheon 11 are formed in one body so that the rear portion of the lens holder 12 can be connected with the front escutcheon 11. Moreover, at the connecting portion of the lens holder 12 and the front escutcheon 11, the cutouts 11a into which extend the projections 9 of the bracket member 6 are formed thus the bracket member 6 can be guided by the wall of the cutout 11a and can slide forward and backward i.e., in the direction of the optical axis. At the rear surface of the escutcheon 11 is mounted a chassis 14 by means of screws 15, the coil springs 10 each being retained at the other end thereof to spring holders 16 at the chassis 14. The bracket member 6 is biased frontward by an elastic force of each spring 10, but the forward movement of the bracket member 6 is regulated due to contact of the projections 9 at the bracket member 6 with the bottoms of the cutouts 11a. As shown in FIGS. 3 and 4, an adjusting ring 17 is fitted onto the outer periphery of lens holder 12 in such a manner that it is rotatable and axially movable (in the direction of optical axis). The projections 9 at the bracket member 6 biased frontward by the coil springs 10 project into the annular grooves 11b through the cutouts 11a formed at the rear of lens holder 12. The rear end surface of the adjusting ring 17 rotatably and movably fitted onto the lens holder 12 can abut against the projections 9 at the bracket member 6. A pair of projections 18 are disposed at a phase difference of about 180° on the outer periphery of lens holder 12. In this embodiment, each projection 18 is composed of a screw, which is inserted through a bore 19 formed at the adjusting ring 17 and screws with a threaded bore 20 at the lens holder 12, the head of the screw 18 projecting from the outer periphery of the lens holder 12.

Figure 2:
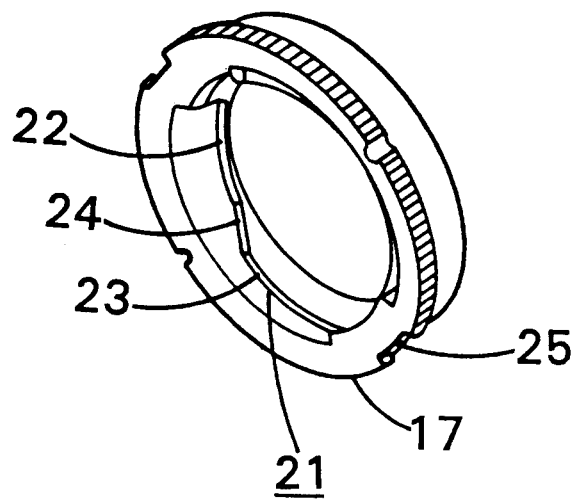

A pair of cam faces 21 are provided at a phase difference of an angle of about 180° on the inner periphery of the adjusting ring 17. The cam faces 21 each comprise mount fine-adjusting portions 22 and 23 positioned at the front and rear portions, respectively, in the axial direction thereof and a mount switching portion 24 for connecting one of the mount fine-adjusting portions 22 and 23 with the other by a slope. Especially, as seen from FIG. 2, the mount fine-adjusting portion 22 is slanted to gently move backward in the axial direction as it leaves the mount switching portion 24 and the mount fine-adjusting portion 23 is slanted to gently move forward in the axial direction as it leaves the same. In the state where the mount fine-adjusting portions 22 engage with the projections 18 of the lens holder 12 respectively, the elasticity of coil spring 10 forwardly moves the adjusting ring 17, the bracket member 6, the image pickup element 1, and so on toward the lens holder 12, thereby switching the mechanism in the particular mounting state (refer to FIG.

5a). Moreover, the engaging position thereof is circumferentially selected to fine-adjust the axial position of the same. In the state where the mount fine-adjusting portions 23 engage with the projections 18 of the lens holder 12 respectively, the adjusting ring 17, the bracket member 6, the image pickup element 1, and so on move backwardly away from the lens holder 12 against the elasticity of each coil spring 10, thereby switching the mechanism to the so-called C-mount state (refer to FIG. 5b). Moreover, the engaging position is circumferentially selected, so that the axial position thereof is adapted to be fine-adjusted. A pair of threaded bores 25 are formed at the adjusting ring 17 and screws 26 screwing with the threaded bores 25 press-contact with the outer periphery of lens holder 12, thereby fixing the adjusting ring 17 to the lens holder 12.

As mentioned above, in this embodiment, the projections 9 at the bracket member 6 biased by the coil springs 10 bias the adjusting ring 17 forwardly, but the cam faces 21 of the adjusting ring 17 abut against the projections 18 at the outer periphery of lens holder 12 to thereby regulate the forward movement of the adjusting ring 17. The adjusting ring 17 is rotated to change the positions where the projections 18 abut against the cam faces 21, thereby changing the distance between the front escutcheon 11 and the bracket member 6.

The lens mounting apparatus of the above-mentioned embodiment works as follows: The adjusting ring 17 is unidirectionally rotated to move forward the adjusting ring 17, the bracket member 6, the image pickup element 1, and so on by the elasticity of each coil spring 10, as shown in FIG. 5a, thereby allowing one mount fine-adjusting portion 22 to engage with the projection 18 at the lens holder 12. Accordingly, the flange back distance A becomes, for example, 12.5 mm to enable the apparatus to be switched for a special mount lens. The engaging position thereof is circumferentially selected to slightly longitudinally move the adjusting ring 17, the bracket member 6, the image pickup element 1, and so on, so that such fine adjustment can absorb variation in the flange back distance of the lens. When the adjusting ring 17 is reversely rotated to the above, the mount fine-adjusting portions 23, following the mount switching portion 24 of the cam faces 21, engage with the projections 18 at the lens holder 12, so that the adjusting ring 17, the bracket member 6, the image pickup element 1, and so on, as shown in FIG. 5b, move backward against the elasticity of each coil spring 10. Hence, the flange back distance A can be switched to, for example, 17.526 mm, for the so-called C mount lens. The engaging position is circumferentially selected to slightly longitudinally move the adjusting ring 17, the bracket member 6, the image pickup element 1, and so on, whereby the fine adjustment can absorb variation in the flange back distance of lenses. During the switching and fine-adjusting operation, a substrate that is mounted on the rear of image pickup element 1 to constitute a circuit, is used to adjust the apparatus while observing an output of the camera. Also, after the switching or the fine adjustment, the screws 26 (FIG. 1) are pressed onto the outer periphery of the lens holder 12, thereby enabling the adjusting ring 17 to be fixed to the lens holder 12.

In this way, at the camera side, the mount fine-adjusting portions 22 and 23 at each cam face 21 of the adjusting ring 17 selectively engage with the projections 18 at the lens holder 12, thereby enabling the lens mount to be switched corresponding to the lenses that are different in flange back distance. Moreover, the engaging positions of the fine-adjusting portions 22 and 23 with respect to the projections 18 are circumferentially fine-adjusted, whereby variation in the flange back distance of lenses can be absorbed and the focus adjustment can be carried out.

As seen from the above, in the present invention, the adjusting ring is selectively rotated in either direction, so that the adjusting ring, the bracket member, and the image pickup element can be moved forward or backward by the use of the elasticity of the spring forward biasing the bracket member or the like. Hence, the apparatus, at the camera side, can use lenses that are different in the flange back distance, absorb variation in each flange back distance, and perform focus adjustment. Thus, the apparatus at the camera side can be provided with various lenses and also at the camera side can use lenses that have no focus adjusting functions, thereby obtaining an inexpensive system as a whole. As mentioned above, the functions of lens can be reduced, which is very effective from the view point of system of the apparatus. Furthermore, the lens base can switch and adjust the flange back distance, thereby facilitating operation of the apparatus.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A lens mounting apparatus for television cameras, comprising a lens mounting mechanism on which a lens is mounted, a ring mechanism supported on said lens mounting mechanism, an elastic member for biasing said ring mechanism in the direction of the optical axis of said lens mounting mechanism, and a regulating member which abuts against a plurality of slanted cam faces formed in said ring mechanism so as to regulate a movement of said ring mechanism by said elastic member in the direction of the optical axis of said lens mounting mechanism, wherein an image pickup element-supporting member is moved toward or away from said lens mounting mechanism corresponding to said movement of said ring mechanism in the direction of said optical axis.

2. A lens mounting apparatus for television cameras according to claim 1, wherein said ring mechanism is provided with said plurality of slanted cam faces, said cam faces being continuously formed, at least one of said slanted cam faces being different in a slant angle from the others.

3. A lens mounting apparatus for television cameras according to claim 1, wherein said lens mounting mechanism is provided with a cylindrical member onto which a lens is mounted, said cylindrical member supporting said ring mechanism.

4. A lens mounting apparatus for television camera according to claim 3, wherein said regulating member is formed by projections, said projections being provided at the outer periphery of said cylindrical member and abutting against said slanted cam faces formed at the inner periphery of said ring mechanism, thereby regulating the movement of said ring mechanism in the direction of said optical axis.

5. A lens mounting apparatus for television cameras according to claim 1, wherein said lens mounting mechanism is provided with a guide mechanism for guiding said image pickup element-supporting member in the direction of said optical axis.

6. A lens mounting apparatus for television cameras according to claim 1, wherein a biasing force of said elastic member is applied to said ring mechanism through said image pickup element-supporting member.

7. A lens mounting apparatus for television cameras comprising a lens mounting mechanism having a cylindrical lens holder onto which a lens is mounted, a bracket member for holding an image pickup element, a guide mechanism for supporting said bracket member at the rear side of said lens mounting mechanism in a slidable manner in the direction of the optical axis of said lens mounting mechanism, an elastic member for biasing said bracket member in the direction of the optical axis of said lens mounting mechanism, a ring mechanism supported rotatably and slidably on said lens holder of said lens mounting mechanism and capable of abutting against said bracket member, a plurality of slanted cam faces formed at the inner periphery of said ring mechanism, and a first set of projections provided at the outer periphery of said lens holder, wherein said ring mechanism that is pressed in the direction of said optical axis by said bracket member biased by said elastic member is regulated by abutment of said slanted cam faces against said projections.

8. A lens mounting apparatus for television cameras according to claim 7, wherein said plurality of slanted cam faces being different in a slant angle are formed in a continuous manner at said ring mechanism.

9. A lens mounting apparatus for television cameras according to claim 8, wherein a third slanted cam face of a steep gradient is formed between first and second cam faces each of a gentle gradient.

10. A lens mounting apparatus for television cameras according to claim 7, wherein cutouts are formed at the rear end of said cylindrical lens holder and a second set of projections formed at the side surface of said bracket member is inserted into said cutouts respectively, thereby slidably supporting said bracket member onto said lens holder by means of said cutouts.

11. A lens mounting apparatus for television cameras according to claim 7, wherein a chassis is mounted to the rear portion of said lens mounting mechanism, so that said elastic member retained at one end thereof to said chassis biases said bracket member.

* * * * *